July 26, 1932. S. O. STAAKE 1,868,773
RUBBER ICE CREAM SHIPPER
Filed Oct. 3, 1929
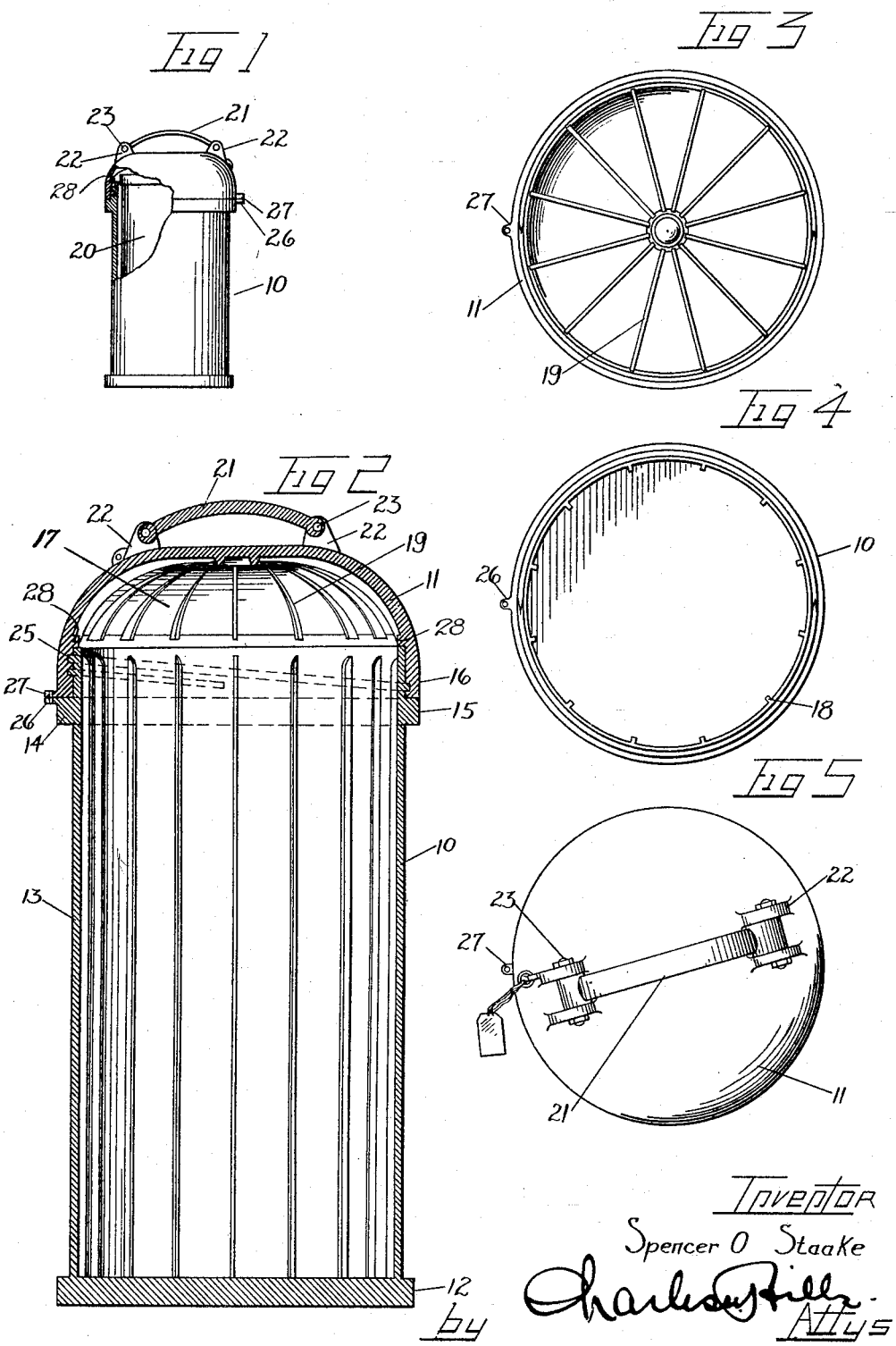

Patented July 26, 1932

1,868,773

UNITED STATES PATENT OFFICE

SPENCER O. STAAKE, OF EAU CLAIRE, WISCONSIN, ASSIGNOR OF ONE-HALF TO RALPH W. HUTCHENS, OF EAU CLAIRE, WISCONSIN

RUBBER ICE CREAM SHIPPER

Application filed October 3, 1929. Serial No. 396,973.

This invention relates to shipping containers and more particularly to a shipper for perishable goods such as ice cream, milk and the like.

In the past it has been customary to ship cans of ice cream in either kegs of ice or canvas lined bags filled with various kinds of heat insulating material. The canvas type of shipper has proven unsatisfactory for the reason that it is expensive and wears out quickly. Moreover, it is in most cases unsanitary as well as cumbersome and it does not present an inviting appearance.

An object of my invention is to provide an improved shipper of the type which does not require the use of ice for ice cream containers and the like.

Another object of the invention is to provide a simple and inexpensive rubber ice cream shipper which is not only highly sanitary but in addition affords a neat and pleasing appearance.

Still another object of the invention resides in the provision of a relatively rigid shipper made of a flexible material whereby the wall of the shipper will adjust itself to conform with the shape of the ice cream can disposed therein so that the shipper can receive the can even though there are slight bumps and irregularities in its surface.

A further object of the invention is to provide a rubber ice cream shipper including a container proper and a top therefor which may be readily applied to the container proper by slightly turning the top on the upper end of the container so as to secure it in place.

Another and further object of the invention resides in the provision of a shipping container for ice cream shaped to conform with the can in which the ice cream is being shipped.

A further object of the invention has to do with the provision of an improved shipper for cans of ice cream and the like capable of relatively rough handling and comprising a rubber container having spaced ribs formed on its inner surface for defining air pockets between the wall of the can and the shipper.

A still further object of the invention is to provide an improved shipper for cans of ice cream and the like whereby a can may be readily housed in the shipper and the shipper may thereafter be quickly closed for the application of a seal thereto.

In accordance with the features of the invention, I provide an ice cream shipper made substantially throughout of rubber including a container and a removable top therefor there being a double screw connection between the top and container for enabling the top to be quickly secured to the container. Another feature of the invention resides in the provision of means connected to the top and the container proper of the shipper for enabling the ready application of a seal thereto to prevent tampering with the contents of the shipper.

Other objects and advantages of my invention will more fully appear from the following detailed description taken in connection with the accompanying drawing which illustrates a single embodiment thereof and in which:

Figure 1 is an elevation of a shipper of my invention partly broken away in order to show the position of an ice cream can therein;

Figure 2 is an enlarged vertical sectional view through the shipper shown in Figure 1;

Figure 3 is a bottom view of the top or cover member of the shipper;

Figure 4 is a plan view of the container of the shipper with the cover or top removed therefrom; and Figure 5 is a plan view of the top of the shipper.

In the drawing:

Like reference characters designate similar parts throughout the several views.

The shipper comprises two parts, namely, a container proper 10 and a cover or top therefor 11. Each of these parts comprises a single molded member which may be made in any suitable rubber molding apparatus. Of course, it is to be understood that although I have disclosed the shipper as being preferably made of rubber, the invention is not to be thus limited for obviously there are a number of other plastic materials which might be used in place of rubber.

The container 10 includes a base 12 and a cylindrical wall 13 formed integral therewith. The upper edge of the wall 13 has formed on its outer side an annular rim 14 defining a shoulder 15 for receiving a ring-like flange 16 formed integral with the top 11. Attention is directed to the fact that the top 11 is formed so as to conform with the shape of the top of an ice cream container or can. In fact, both the container and the top are so shaped as to receive and conform to the shape of an ice cream can.

The interior surface of the wall 13 has formed integral with it a plurality of spaced vertical ribs 18 adapted to embrace the wall of the can inserted in the container. Also it is to be noted that the portion 17 of the top 11 has formed in it a plurality of slanting ribs 19 adapted to engage the top of an ice cream can such as the can shown in Figure 1 and designated generally by the reference character 20.

It will be evident that even though the wall of the ice cream can may have slight bumps or other irregularities therein, these irregularities will not prevent the insertion of the can in my rubber shipper due to the fact that the wall 13 of the shipper is relatively flexible and can readily conform to the shape of the can therein. Of course, it is to be remembered that even though the wall 13 is flexible the container as a whole is relatively rigid so that it is at all times maintained in substantially the shape shown in Figure 1.

The ribs 18 and 19 serve to space the wall and top of the can in the shipper from the inner surfaces of the container 10 and the top 11 so that air pockets are maintained between the shipper and the outer surface of the can. These air pockets will aid in the preservation of the ice cream or other perishable goods in the can within the shipper.

The top 11 of the shipper is provided with a handle 21 which is made of rubber and is secured to rubber brackets 22—22 by means of bolts and nuts 23.

The top 11 is secured to the container 10 by means of a double screw thread connection designated by the reference character 25. That is to say, the inner surface of the flange 16 of the cover 11 is formed with a double screw thread cooperable with a screw thread formed on the outer surface of the upper end of the container 10.

This double screw connection is of such a size that the top may be tightly secured to the container 10 by merely turning the top to a slight extent. In fact, with this arrangement I find that it is only necessary to rotate the top a half a turn in order to tightly secure it in place on top of the container 10.

This construction is highly advantageous since it enables the shipper to be quickly filled with the can of ice cream and the cover applied thereto with a minimum of effort and in a minimum of time.

The container flange 14 is provided with a laterally extending lug 26 which is adapted to cooperate with a similar lug 27 formed on the flange 16 of the cover. Each of these lugs is apertured and the apertures of these lugs are adapted to be brought into alignment as shown in Figure 2 when the top 11 is firmly and tightly secured to the container 10. The purpose of these apertured lugs is to enable the application of a suitable seal thereto so as to prevent tampering with the contents of the shipper.

My novel shipper is highly advantageous in view of the fact that it may be readily sterilized and may be roughly handled without damaging the ice cream can therein since the rubber of which the shipper is made takes up any impact or blow which may be imposed upon the shipper during the handling of the same. Also, it is to be noted that the cover 11 has a tight fit on top of the container 10, so that when the cover is in its closed position the inside of the shipper is completely sealed from the surrounding atmosphere, thus enabling the ice cream or other perishable goods therein to be insulated from the deleterious effects of the atmosphere. It will be observed that when the cover 11 is screwed home on the thread 25, an inwardly directed integrally formed flanged 28 of the cover rests on the end of the container 10 to form a seal therewith.

Now, of course, it is to be understood that although I have illustrated and described in detail the preferred form of my invention, the invention is not to be thus limited, but only in so far as defined by the scope and spirit of the appended claim.

I claim as my invention:

A shipping device for ice cream cans and the like, said device comprising an elongated container of yieldable rubber material having an integrally formed exterior flange adjacent its open end, said container having exterior screw-threads formed thereon intermediate the flange and the end of the container, a cover of yieldable rubber material for the container, said cover having a ring-like portion thereof provided with interior threads formed thereon and an inwardly directed integral flange, the screw-threads on said container and on said cover providing yieldable means for forcing said cover into sealing engagement with the exterior flange of the container and for forcing the flange of the cover into sealing engagement with the end of the container when the cover is rotated to close the container.

In testimony whereof I have hereunto subscribed my name at Eau Claire, Eau Claire county, Wisconsin.

SPENCER O. STAAKE.